Feb. 17, 1959 F. E. RILEY 2,873,796
TUBELESS TIRE BEAD SEATING DEVICE
Filed June 10, 1954 5 Sheets-Sheet 1

INVENTOR.
FLOYD E. RILEY
BY
William Cleland
ATTORNEY

Feb. 17, 1959 F. E. RILEY 2,873,796
TUBELESS TIRE BEAD SEATING DEVICE
Filed June 10, 1954 5 Sheets—Sheet 2
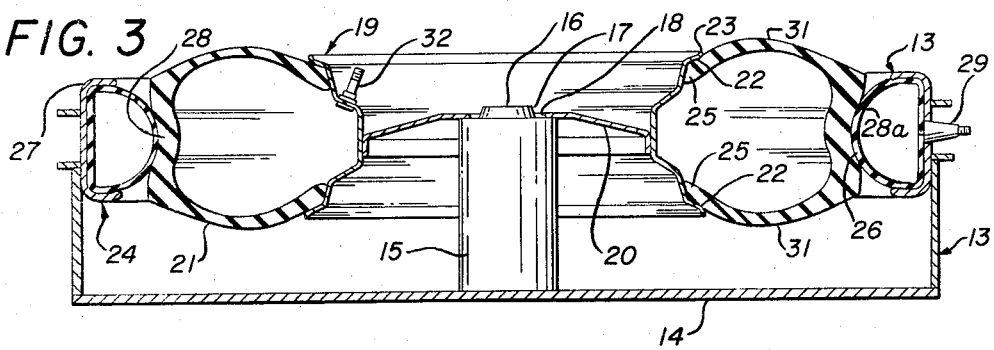
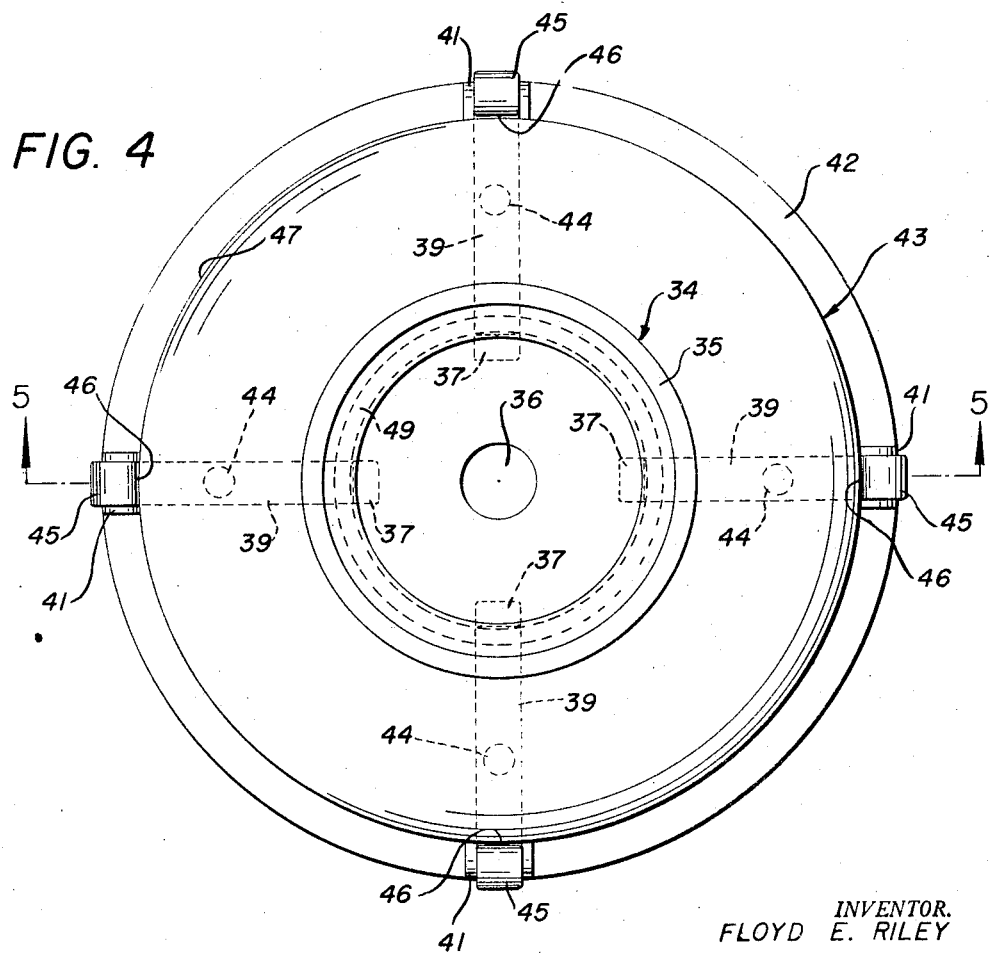
INVENTOR.
FLOYD E. RILEY
BY William Cleland
ATTORNEY

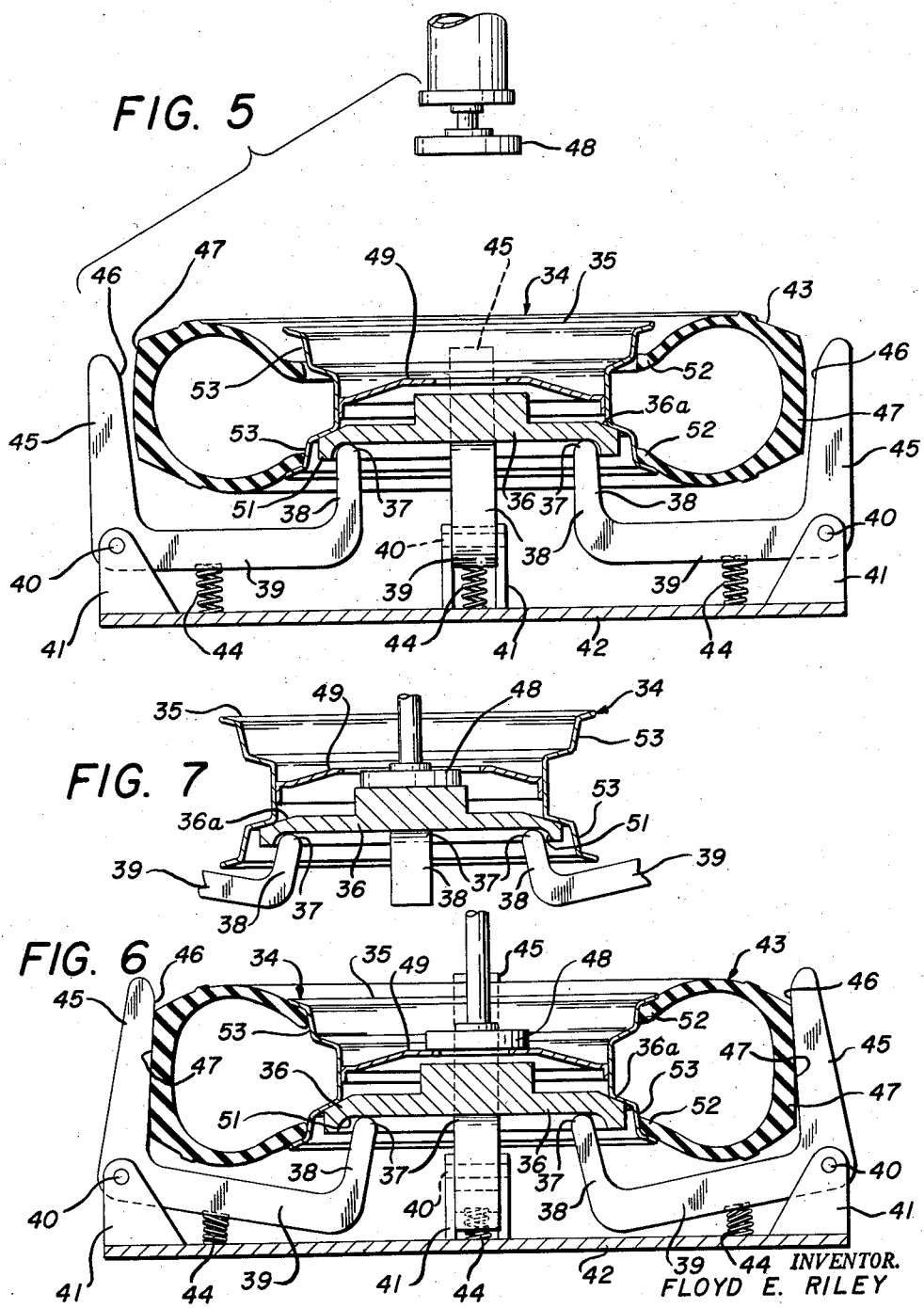

INVENTOR.
FLOYD E. RILEY
BY
William Cleland
ATTORNEY

Feb. 17, 1959 F. E. RILEY 2,873,796
TUBELESS TIRE BEAD SEATING DEVICE
Filed June 10, 1954 5 Sheets-Sheet 5

INVENTOR.
FLOYD E. RILEY
BY
William Cleland
ATTORNEY

United States Patent Office 2,873,796
Patented Feb. 17, 1959

2,873,796

TUBELESS TIRE BEAD SEATING DEVICE

Floyd E. Riley, Akron, Ohio, assignor to Roy R. Putt, Akron, Ohio

Application June 10, 1954, Serial No. 435,707

4 Claims. (Cl. 157—1.21)

This invention relates to tire mounting devices, and in particular relates to apparatus for mounting tubeless tires in air-sealed relation on wheel rims thereof.

In applying a tubeless tire to a rim great difficulty is encountered in positioning the tire with the usual annular bead portions seated in air-sealing relation in the bead seats of the rim. That is, there is nothing inside the tire which could be utilized to spread the beads apart mechanically, and expansion of the tire by means of air pressure is not possible so long as the beads are not in said air-sealing relation.

One object of the present invention is to provide a device of the character described, in the simplest form of which little more than the movement of positioning the tire and rim assembly in the same is automatically effective to spread the tire beads apart into air-sealing relation with the rim bead seats.

Another object of the invention is to provide tire mounting apparatus of the character described in which said beads are spread apart by yielding or resilient compressive force applied around the outer periphery of the tire, whereby the tire may be inflated to desired pressure while said compressive force is applied, and thereby tending automatically to release the compressive force after the inflation pressure takes over to hold the tire beads in the rim bead seats.

Another object of the invention is to provide improved tire mounting action of the character described, wherein the tire being mounted will not be choked or constricted inwardly against the inflation pressure to place undue strain upon the tire structure, and in particular upon the usual fabric layers of the tire.

Another object of the invention is to provide a tire mounting device of the character described wherein the tire and rim assembly is easily removed after the tire is fully mounted on the rim.

Other objects of the invention will be manifest from the following brief description and the accompanying drawings.

Of the accompanying drawings:

Figure 3 is a vertical cross-section through the apparatus shown in Figure 1 and corresponding to the sectional part of Figure 2, but illustrating the device in operative condition spreading the tire beads apart.

Figure 4 is a top plan view, corresponding to Figure 1, of a modified form of the invention.

Figure 5 is a vertical cross-section taken substantially on the line 5—5 of Figure 4.

Figure 6 is a vertical cross-section, corresponding to Figure 3, and also illustrating the modification in an operative bead-spreading condition.

Figure 7 is a fragmentary cross-section corresponding to the central portion of Figure 6, showing use of the device with a different wheel.

Figure 1:
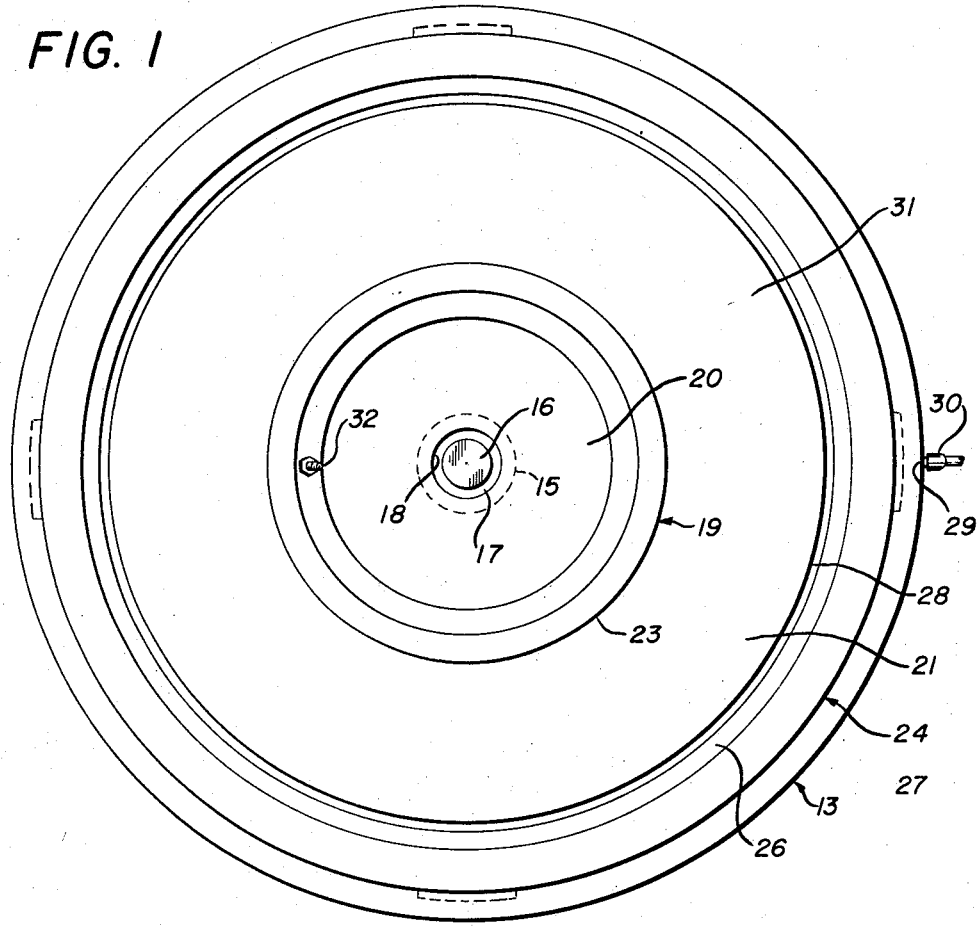
Figure 1 is a top plan view of one form of tire mounting device embodying the features of the invention, illustrating a tire and rim assembly in an initial position for a bead spreading operation.
Figure 2:
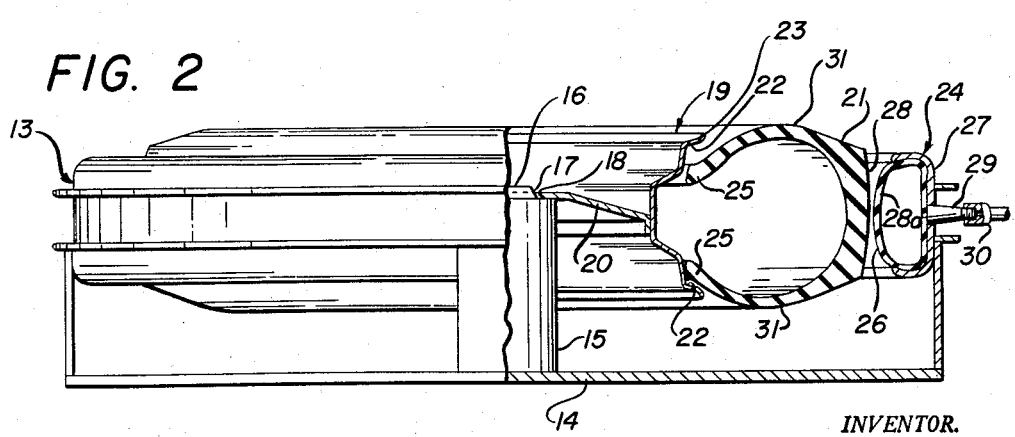
Figure 2 is a front view thereof, partly broken away and in section.

Referring particularly to Figures 1, 2 and 3 of the drawings there is shown a tire mounting machine 13, the numeral 14 designating a frame or base on which is a central upright post 15 provided with a reduced upper end portion or stem 16, tapered at 17 for centering reception through the usual hub opening 18 of a disc-type wheel 19, said end portion defining an upwardly presented annular seat for supporting engagement with the disc 20 of the wheel. The post is adapted to support the wheel in a general horizontal plane thereof, with a tubeless tire 21 more or less loosely received between the usual spaced annular tire bead seats 22, 22 of a dropcenter type rim 23, which is an integral part of the wheel.

Inflation means 24 is provided for spreading beads 25, 25 of the tire apart and into the rim bead seats 22. Said inflation means 24 may comprise an annular tube 26, of vulcanized rubber or like air-impervious elastic material, securely mounted in an annular channel-shaped backing member 27 which is fixedly supported on said base 14 to be substantially in the general plane of a tire and rim assembly supported on post 15, as described above, said channel opening radially inwardly to present substantially the full width of tube 26 concentrically toward the outer tread portion 28 of the tire, and initially in spaced relation thereto (see Figures 1 and 2). For inflating tube 26 to expand the same into full compressive engagement with the tread portion 28 of the tire, a valve 29 may extend radially outwardly of the tube for attachment of a conduit 30 from a source of pressurized air (not shown).

In use of the improved tire mounting machine 13 described above, a wheel 19 with a tire 21 loosely received in the drop center rim 23 thereof, is lowered to centered supporting position on top of the post 15, in which the outer tread portion 28 of the tire will be peripherally concentric with the inwardly exposed wall 28a of the inflation tube 26 and in spaced relation thereto, as shown in Figure 2. In this initial operative position the general plane of the tire and rim assembly will be substantially in general plane of the inflation tube 26.

Upon application of air pressure to tube 26 the same may be expanded inwardly against the tire entirely around the outer peripheral portion 28 thereof, thereby yieldingly to compress the tread portion inwardly and to transmit natural reflexes to the sidewalls 31, 31 of the tire, with resultant outward flexing of the bead portions 25, 25 which positions the same in firm pressure-sealing relation in the rim seats 22, 22, as shown in Figure 3. While the bead portions are thus held seated, air-pressure may be applied within the tire in known manner, through a valve 32 on the rim, to inflate the tire as desired. Proper inflation pressure in the tire will, of course, maintain the tire beads in requisite sealing positions in the rim seats after deflation of the tube 26.

As the air-pressure within the tube 26 is yielding in nature, the inflated tube 26 will yield to predeterminately higher inflation pressure within the tire. Thus, there will be no severe stresses applied to the tire structure when it is inflated against the lower yielding pressure of the tube 26.

After deflation of tube 26, the wheel 19 with the inflated tire 21 on rim 23 thereof easily may be lifted from the machine.

Referring now to Figures 5 and 6, there is shown wheel 34, including a drop-center rim 35, supported on a disc or plate 36, in turn resting on rounded ends 37 of upturned fingers 38 of a series of peripherally spaced arms 39, 39, which are pivoted at 40 on brackets 41, 41 mounted on a frame or base plate 42, said arms extending radially inwardly of the brackets and supporting the weight of rim 35 and a tire 43 thereon, against the yielding resiliency of compression springs 44 mounted between the arms and plate 42. Angular upturned extensions 45 from the pivotal ends of the arms 39 have radially inwardly presented substantially vertical faces or edges 46 adapted normally to be in spaced relation to the outer periphery of the tire tread 47, as shown in Figure 5. A pressure actuated plunger 48 may be provided above the apparatus and adapted to be engaged with the upper central portion of wheel disc 49 to urge the wheel 34 downwardly against yielding action of the springs 44, for a tire mounting operation, to be described later.

The wheel-supporting disc 36 may have a beveled or conical upper marginal edge portion 36a, for self-centering engagement with complementally beveled portions of the wheel rim 35. For positioning and retaining the disc 36 on the fingers 38, a marginal flange 51 may be provided on the underside of the disc.

In use of the apparatus shown in Figures 5 and 6, a wheel 34, with the tire 43 loosely positioned thereon is centered on the wheel-supporting disc 36, as shown in Figure 5. Next, the plunger 48 is operated downwardly into engagement with the wheel, and through resultant downward movement of the wheel and disc 36 to pivot the arms 39 downwardly against the resiliency of springs 44. This causes the arm extensions 45 to be urged radially inwardly at peripherally spaced points, and thereby, through compression of the tire tread and resultant flexure of the sidewalls of the tire, causing the tire bead portions 52, 52 to be urged apart into tight air-sealing relation in the rim bead seats 53, 53. As before, the tire may be inflated while the downward bead-spreading pressure on the wheel 34 is at least partially maintained, or substantially as previously described. In any event, the wheel and tire assembly is easily removed upwardly of the machine upon raising the plunger or otherwise releasing downward pressure on the wheel.

Figure 7 shows a condition wherein the hub opening in the wheel disc 49 is relatively large, whereby the plunger 48 is engageable through said opening into direct contact with the disc 36. Because the arms 39 are operated by said disc the bead-spreading action on the tire will be substantially the same as before.

Figure 8:
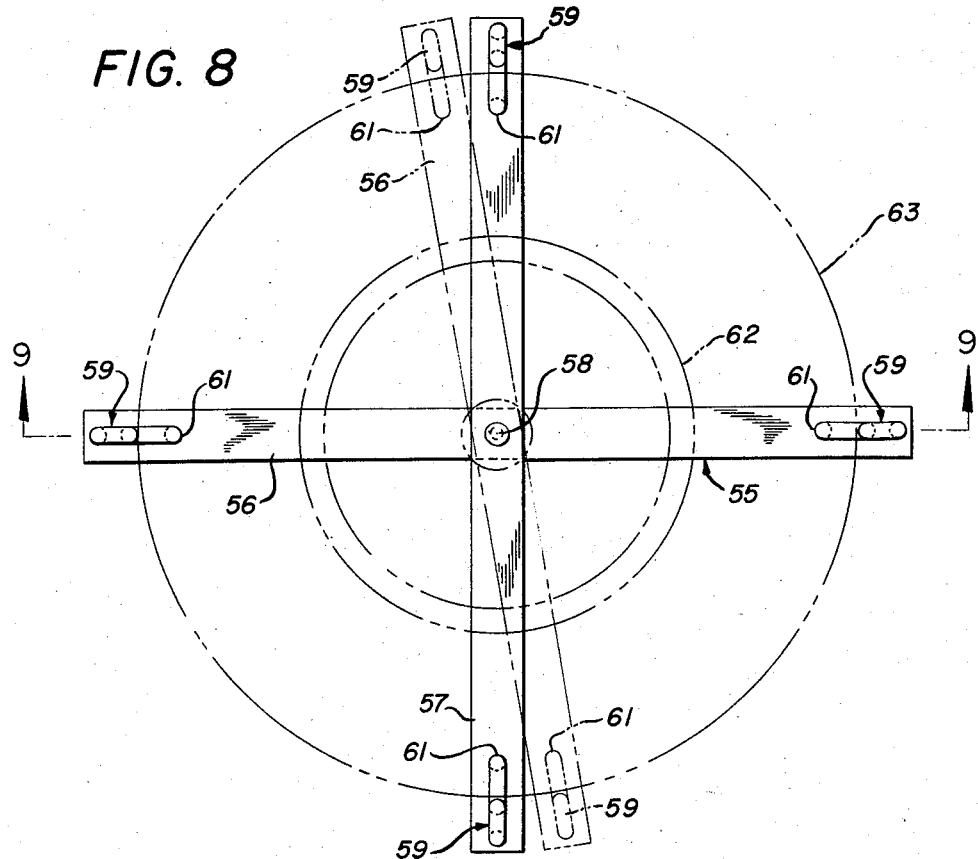
Figure 8 is a top plan view, corresponding to Figure 1, of another modified form of the invention, with a tire and rim assembly in an initial operative position.
Figure 9:
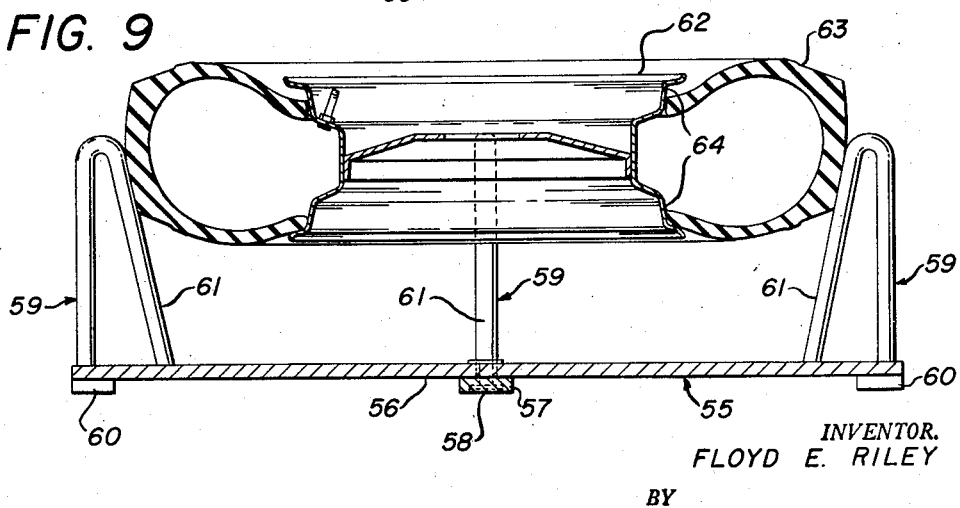
Figure 9 is a vertical cross-section, taken substantially on the line 9—9 of Figure 8.
Figure 10:
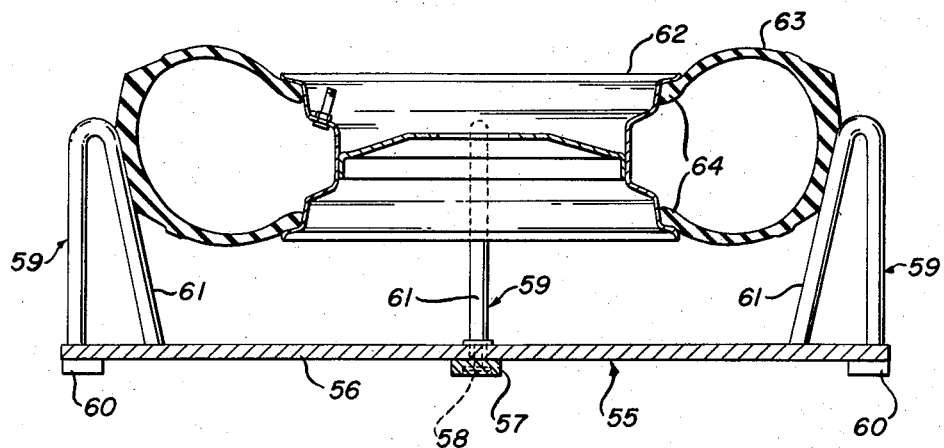
Figure 10 is a cross-section corresponding to Figure 9, but showing the device in bead-spreading operative condition.

Referring now to Figures 8 to 10, wherein is shown a more simple form of the invention, the numeral 55 designates a base or frame, comprising a pair of flat bars 56 and 57 centrally pivoted to each other, as indicated at 58, the bars having upright bead-spreading members 59, 59 attached to the opposite outer ends thereof to be in peripherally spaced relation in right angularly arranged positioning of the bars, as shown in full lines in the drawings under consideration. For level support of the base 55, feet 60, 60 are provided on the underside of the top bar 56.

The upright members 59 may comprise a length of round rod reversely formed to provide inwardly presented tire-engaging portions 61, 61 which extend at a downward and inward inclination to the base 55.

This arrangement is such that in use a wheel 62, having a tire 63 loosely mounted in a rim 64 thereof, may be manually lowered and pressed between the members 59 (see Figure 9), until the inclined portions 61 compress the tread portion of the tire inwardly, as shown in Figure 10, thereby to urge the tire beads 64, 64 into firm seating relation in the rim bead seats. In this Figure 10 position, inflation air may be applied within the tire before removal of the wheel and tire assembly from the machine.

When the device of Figures 8 to 10 is not in use it may be collapsed to compact condition for storage purposes, substantially as indicated in full and chain-dotted lines in Figure 8.

In all forms of the invention described above the operation of spreading the tire beads apart into firm seating relation in the rim seats is effectively accomplished by little more than the mere motion of placing a wheel and tire assembly in the particular device, and the finished work is readily lifted from the device without substantial interference by obstructing parts of the same. In other words, it is entirely possible that a tubeless tire may be fully mounted on a wheel in a relatively few seconds necessary to move the wheel vertically into and out of the apparatus with substantially continuous motion.

Other modifications of the invention may be resorted to without departing from the spirit thereof or the scope of the appended claims.

What is claimed is:

1. Apparatus for seating the beads of a tubeless tire mounted on a rim having spaced annular bead seats, comprising a frame, a plurality of yieldingly depressible elements pivotally mounted on said frame in peripherally spaced relation and having portions on which said rim is adapted to be supported thereby in axially centered relation thereof, angular extensions on said elements being movable radially inwardly of the rim toward depressive engagement with the outer periphery of the tread of a tire on the rim upon depression of the elements with movement of the rim supported thereby, said depressive engagement of the extensions with the tire tread thereby being effective to spread the tire beads apart into seating relation in the rim bead seats.

2. Apparatus for seating the beads of a tubeless tire mounted on a rim having spaced annular bead seats, comprising a frame, a plurality of yieldingly depressible spring-pressed elements pivotally mounted on said frame in peripherally spaced relation and having portions on which said rim is adapted to be supported thereby in axially centered relation thereof, angular extensions on said elements being movable radially inwardly of the rim toward depressive engagement with the outer periphery of the tread of a tire on the rim upon depression of the elements with movement of the rim supported thereby, said depressive engagement of the extensions with the tire tread thereby being effective to spread the tire beads apart into seating relation in the rim bead seats, and means outwardly of said elements operable to depress said elements.

3. Apparatus for seating the beads of a tubeless tire mounted on a rim having spaced annular bead seats, comprising a frame, yieldingly depressible spring-pressed elements pivotally mounted on said frame in peripherally spaced relation, a plate supported on said spring-pressed elements, said plate having seat portions for supporting said rim in axially centered relation, angular extensions on said elements being movable radially inwardly of the rim toward depressive engagement of the pressure members with the outer periphery of the tread of the tire upon depression of the elements with movement of the rim supported thereby, said depressive engagement of the extensions with the tread portion thereby being effective to spread the usual tire beads apart into seating relation in the rim bead seats.

4. Apparatus for mounting a tire on a rim having spaced annular bead seats, comprising a frame, yieldingly depressible spring-pressed elements pivotally mounted on said frame in peripherally spaced relation, a plate supported on said spring-pressed elements, said plate having seat portions for supporting said rim in centered relation, angular extensions on said elements being movable radially inwardly of the rim toward depressive engagement with the outer periphery of said tire on the rim upon depression of the elements with movement of the rim supported thereby, said depressive engagement of the extensions with the tire thereby being effective to spread the usual tire beads apart into seating relation in the rim bead seats, said plate having inturned peripheral flange portions on the side opposite said seat portions, said elements having outturned fingers supportingly engaging said plate within the boundaries of said flange portions.

References Cited in the file of this patent

UNITED STATES PATENTS

| | | |
|---|---|---|
| 1,189,828 | Kaltz | July 4, 1916 |
| 1,312,615 | Cooper | Aug. 12, 1919 |
| 1,352,722 | Caldwell | Sept. 14, 1920 |
| 1,399,770 | House | Dec. 13, 1921 |
| 1,457,496 | Butler | June 5, 1923 |
| 1,578,760 | Replogle | Mar. 30, 1926 |
| 1,738,504 | Stevens | Dec. 3, 1929 |
| 1,966,580 | Bull | July 17, 1934 |
| 2,351,355 | Merrett | June 13, 1944 |
| 2,513,756 | Smyser | July 4, 1950 |
| 2,712,850 | Rerick | July 12, 1955 |